United States Patent
Preiss

(10) Patent No.: US 8,091,516 B2
(45) Date of Patent: Jan. 10, 2012

(54) COOLING DEVICE

(75) Inventor: Michael Preiss, Vaihingen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 329 days.

(21) Appl. No.: 12/428,505

(22) Filed: Apr. 23, 2009

(65) Prior Publication Data

US 2009/0266312 A1   Oct. 29, 2009

(30) Foreign Application Priority Data

Apr. 24, 2008  (DE) .......................... 10 2008 020 399

(51) Int. Cl.
 *F01P 7/02*   (2006.01)
 *B60K 11/00*   (2006.01)
(52) U.S. Cl. .................................. 123/41.05; 180/68.1
(58) Field of Classification Search ............... 123/41.05; 296/1; 180/68.6, 68.1
See application file for complete search history.

(56) References Cited

U.S. PATENT DOCUMENTS

| | | | | |
|---|---|---|---|---|
| 4,457,558 A | * | 7/1984 | Ishikawa | 296/180.5 |
| 4,706,615 A | * | 11/1987 | Scadding | 123/41.01 |
| 5,322,340 A | | 6/1994 | Sato et al. | |
| 5,732,666 A | * | 3/1998 | Lee | 123/41.05 |
| 5,901,786 A | * | 5/1999 | Patel et al. | 165/283 |
| 6,854,544 B2 | | 2/2005 | Vide | |
| 2008/0017138 A1 | | 1/2008 | Rogg | |

FOREIGN PATENT DOCUMENTS

| | | |
|---|---|---|
| DE | 43 17 769 A1 | 1/1994 |
| DE | 196 52 398 A1 | 6/1998 |
| DE | 102 28 422 A1 | 1/2003 |
| DE | 10 2005 024 444 A1 | 12/2005 |
| FR | 1045729 A | 12/1953 |
| JP | 3-167032 A | 7/1991 |
| JP | 2003-072394 A | 3/2003 |
| WO | 99/61300 A1 | 12/1999 |

OTHER PUBLICATIONS

German Patent and Trademark Office Search Report, dated Nov. 24, 2008.

* cited by examiner

*Primary Examiner* — Noah Kamen

(57) ABSTRACT

A cooling device in an engine bay of a motor vehicle has a radiator and a radiator louver with at least one lamella that controls the passage of a gas flow through the radiator. At least one bypass duct bypasses the radiator and can be closed off by an associated closing element which is operatively connected to the radiator louver in such a way that an opening of the radiator louver generates a closing of the closing element, and therefore of the associated bypass duct, and vice versa. The radiator louver and the at least one closing element are coupled to one another in such a way that, regardless of the position of the lamellae of the radiator louver and the position of the at least one closing element, an at least approximately uniform lift force, or an at least approximately uniform pitching moment, is imparted to the vehicle.

13 Claims, 1 Drawing Sheet

COOLING DEVICE

CROSS-REFERENCE TO RELATED APPLICATION

This application claims the priority, under 35 U.S.C. §119, of German application DE 10 2008 020 399.8, filed Apr. 24, 2008; the prior application is herewith incorporated by reference in its entirety.

BACKGROUND OF THE INVENTION

Field of the Invention

The present invention relates to a cooling device which is disposed in an engine bay of a motor vehicle, having a radiator and having a radiator louver which has at least one lamella and which controls the passage of a gas flow through the radiator. The assembly also has at least one bypass duct which bypasses the radiator and which can be closed off by an associated closing element which is operatively connected to the radiator louver in such a way that an opening of the radiator louver generates a closing of the closing element, and therefore of the associated bypass duct, and vice versa. The invention also relates to a motor vehicle fitted with a cooling device of this type.

German published patent application DE 196 52 398 A1 discloses a generic cooling device for a motor vehicle, with a radiator of the cooling device being provided with a radiator louver, which controls the passage of the gas flow, and with a hood which holds a fan. Likewise provided is a bypass for a gas flow which is to be conducted not through the radiator but rather around the latter. Here, the opening into the bypass is provided between the radiator and the radiator louver, while the outlet out of the bypass is situated outside an encapsulation of the engine bay. In this way, it is intended to prevent noise emerging from the engine bay, and to nevertheless ensure that the radiator is traversed at least slightly by a gas flow, when the radiator louver is closed.

German published patent application DE 10 2005 024 444 A1 and it counterpart U.S. patent application publication US 2008/0017138 A1 disclose a cooling system, having at least one radiator which has a radiator air-passage surface. In a first operating phase, in particular in a so-called ram-pressure mode, the radiator air-passage surface is traversed by a gas flow along a first air flow path, while the radiator air-passage surface, in a second operating phase, in particular in a so-called fan mode, is additionally or alternatively traversed by an air flow along a second air flow path which runs through an air feed device. Here, the air feed device and the radiator are designed and arranged in such a way that a parallel projection of the feed air-passage surface in the longitudinal direction of the vehicle onto the plane in which the radiator air-passage surface is situated protrudes at least partially beyond the radiator air-passage surface, wherein a significant part of the radiator air-passage surface is not overlapped by the parallel projection of the feed air-passage surface. In this way, it is intended to create a cooling system in which, firstly, the cooling air flow in the first operating phase is hindered as little as possible along the first air flow path, and in which, secondly, low-loss feeding of the cooling air flow along the second air flow path is possible in the second operating phase.

Radiator louvers, as they are known, which deflect or regulate a gas flow passing through the radiator have been known for a relatively long time and are conventionally utilized to block the inlet of air into the radiator during a start of the engine until the cooling water has reached a certain limit value. The radiator louver is then opened until a temperature threshold of the cooling water is undershot, at which point the radiator louver closes again. Instead of always being provided, regardless of the load, with the amount of cooling air required by the engine in the rare case of full load, the engine is provided only with the amount of cooling air which it actually requires in the present load state. Here, it is known that the cd value and therefore the fuel consumption of the motor vehicle can be reduced by closing the radiator louver. A disadvantage of the previously known solutions is however that a lift force, in particular a front wheel lift force, and therefore a pitching moment is imparted to the vehicle as a function of the position of the radiator louver, which leads overall to intense changes in the lift force balance and therefore in driving behavior. Here, the influencing of the driving behavior takes place unnoticed by the driver, as a result of which dangerous moments can be generated under some circumstances.

SUMMARY OF THE INVENTION

It is accordingly an object of the invention to provide a cooling assembly, which overcomes the above-mentioned disadvantages of the heretofore-known devices and methods of this general type and which provides an improved cooling device, which does not adversely affect a driving behavior of a motor vehicle which is fitted with the cooling device.

With the foregoing and other objects in view there is provided, in accordance with the invention, a cooling device disposed in an engine bay of a motor vehicle, comprising:

a radiator and a radiator louver with one or more lamellae for controlling a passage of a gas flow through the radiator;

at least one bypass duct disposed to bypass the radiator and a closing element disposed to selectively close off the at least one bypass duct; and the closing element being operatively connected to the radiator louver such that an opening of the radiator louver effects a closing of the bypass duct by closing the closing element, and a closing of the radiator louver effects an opening of the bypass duct by opening the closing element; and the radiator louver and the closing element being coupled to one another such that a substantially uniform lift force, or a substantially uniform pitching moment, is imparted to the motor vehicle, regardless of a position of the at least one lamella of the radiator louver and a position of the closing element.

The invention is based on the general concept, in a cooling device which is arranged in an engine bay of a motor vehicle and which has a radiator louver for regulating the gas flow flowing through a radiator of the cooling device, and with at least one bypass duct additionally being provided which bypasses the radiator and which can be closed off by a corresponding closing element, for coupling the radiator louver and the at least one closing element to one another in such a way that, regardless of their positions, an at least approximately uniform lift force, or an at least approximately uniform pitching moment, is imparted to the vehicle. Here, the radiator louver is operatively connected to the closing element in such a way that an opening of the radiator louver simultaneously generates a closing of the closing element, and therefore a closing of the associated bypass duct, and vice versa. In cooling devices known from the prior art, if the radiator louver is closed and the closing element which closes off the bypass duct is simultaneously opened, a front axle lift force decreases intensely, whereas the rear axle lift force increases slightly as a result of the associated increasing pitching moment or pitching torque. When the radiator louver is opened and the closing element is therefore closed, an opposite effect is generated, that is to say the front axle lift force increases, while the rear axle lift force decreases. Here, the pitching moment, which is dependent on the position of the radiator louver and on the position of the closing element, influences the driving behavior in a way which cannot be controlled by the driver of the motor vehicle. The effect, that is to say an increase or decrease of the front axle lift force with a simultaneous decrease or increase of the rear axle lift force, is compensated by means of the cooling device according to the invention by means of a corresponding coupling of the closing element and of at least one lamella of the cooling device, such that, at preferably all conceivable positions of the lamellae of the radiator louver and of the closing element, a uniform, preferably positive pitching moment prevails in the vehicle. This has the great advantage that the gas flow flowing through the radiator can be controlled in the same way as before, but without a pitching moment of the motor vehicle and therefore the driving behavior of the motor vehicle being influenced in any way.

In accordance with an added feature of the invention, the radiator louver is arranged in front of the radiator in the direction of travel. Therefore, in contrast with the solutions known from the prior art, no ram pressure is generated in the radiator when the radiator louver is closed, but rather the approaching gas flow is deflected, preferably downward, into the bypass duct before the inlet into the radiator itself. In this way, it is possible in particular to reduce contamination of the radiator and therefore to reduce an impairment of efficiency, since the radiator is no longer exposed to a gas flow when the radiator louver is closed.

In accordance with an additional feature of the invention, the closing element is operatively connected to the lowermost lamella of the radiator louver by means of an actuating element, for example in the form of a rod. Here, it is of course also conceivable for the radiator louver or for individual lamellae thereof to be coupled to the closing element not directly but rather indirectly via a corresponding drive, such that the drive actuates both the closing element and also the lamellae of the radiator louver in parallel. By means of an actuating element which is provided according to the invention and which is arranged between the lowermost lamella of the radiator louver and the closing element, it is however possible for an actuation to take place exclusively via the radiator louver or via the closing element, which radiator louver or closing element then transmits the closing or opening movement via the actuating element to the closing element or to at least one lamella of the radiator louver respectively. A connecting element of the type may for example be designed in the form of a steel wire or plastic pin and can thereby permit a mechanically extremely simple connection.

In one advantageous refinement of the solution according to the invention, the closing element and at least one lamella of the radiator louver are designed as identical parts. Here, it is preferable for all of the lamellae of the radiator louver and the closing element to be designed as identical parts, as a result of which the multiplicity of parts during the production process, and consequently the storage and logistics costs, can be reduced. In such an embodiment, the bypass duct conventionally has a slot-shaped inlet which can be closed off by preferably a single closing element which is designed as a lamella.

In accordance with another feature of the invention, the individual lamellae of the radiator louver are arranged so as to be substantially aligned with one another in the closed state, while the lamellae are arranged obliquely with respect to one another in an at least partially open state and thereby cause the gas flow entering into the radiator to fan out. The fanning-out of the gas flow to be supplied to the radiator results in the radiator being acted on in a particularly uniform fashion with a gas flow which cools the radiator, as a result of which the efficiency of the radiator itself can be increased. The fanning-out movement of the individual lamellae can be generated here by means of a corresponding adjusting mechanism between the individual lamellae.

Other features which are considered as characteristic for the invention are set forth in the appended claims.

Although the invention is illustrated and described herein as embodied in a cooling device, it is nevertheless not intended to be limited to the details shown, since various modifications and structural changes may be made therein without departing from the spirit of the invention and within the scope and range of equivalents of the claims. It is specifically noted that the above-explained features and the features yet to be explained below can be used not only in the respectively specified combination but rather also in other combinations or individually without departing from the scope of the present invention.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
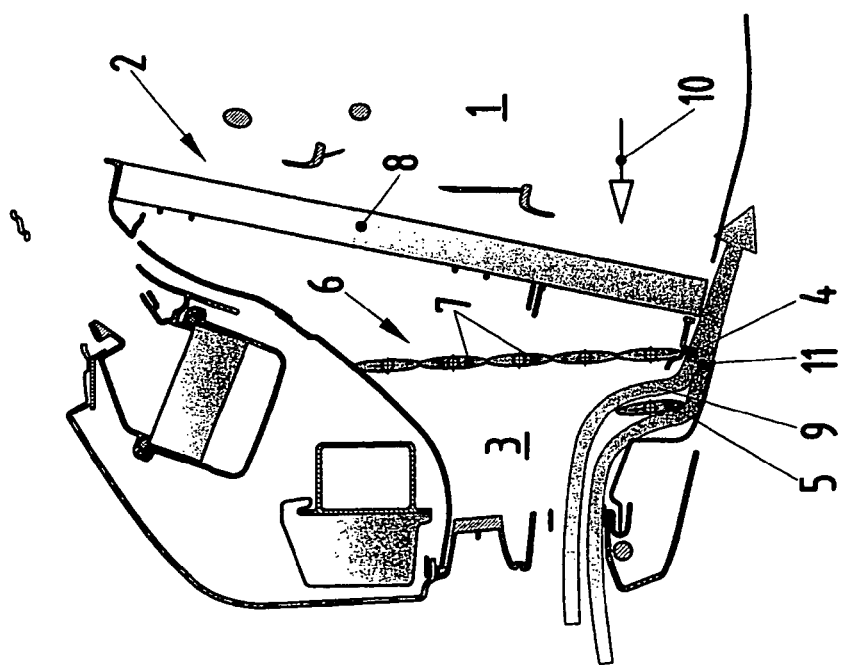
FIG. 1 shows a diagrammatic sectional illustration through a cooling device according to the invention with the bypass duct open.

Referring now to the figures of the drawing in detail and first, particularly, to FIG. 1 thereof, there is shown a cooling assembly or cooling device 2 arranged in a forward region of an engine bay 1 of a motor vehicle. The cooling device 2 substantially comprises a main duct 3, a bypass duct 4, a closing element 5 for closing off the bypass duct 4, a radiator louver 6 with a plurality of (in this case a total of five) lamellae 7, and a radiator 8. The latter is also referred to as a heat exchanger or cooler 8. Here, the radiator louver 6 is used to control a gas flow flowing through the main duct 3. Here, the bypass duct 4 has an inlet 9 which is arranged, in the lower region of the main duct 3, in front of the radiator 8 in the direction of travel 10. The radiator louver 6 is likewise arranged in front of the radiator 8 in the direction of travel 10. An outlet 11 of the bypass duct 4 which bypasses the radiator 8 is aligned substantially horizontally with respect to the direction of travel 10 and is arranged below the radiator 8, whereas the inlet 9 is aligned substantially vertically.

Figure 2:
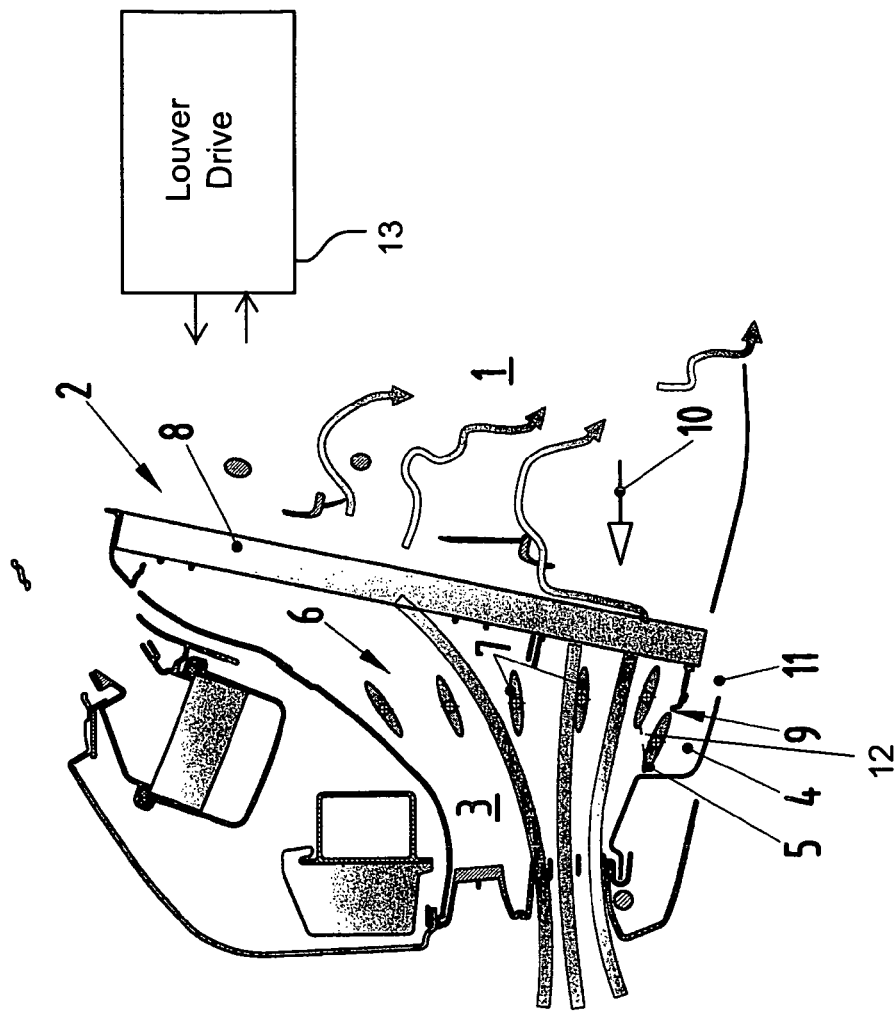
FIG. 2 is a similar view thereof, but with the bypass duct closed.

The illustrations in FIGS. 1 and 2 show merely one bypass duct 4 which is situated in the section plane. It will be readily understood, of course, that a plurality of bypass ducts 4 may be provided which can be closed off by a respectively associated closing element 5. Here, the closing element 5 is operatively connected to the radiator louver 6 in such a way that an opening of the radiator louver 6 (cf. FIG. 2) simultaneously generates a closing of the closing element 5, and therefore a closing of the associated bypass duct 4, and vice versa (cf. FIG. 1).

Since a front axle lift force and a rear axle lift force and therefore a pitching moment (i.e., a longitudinal torque) of the motor vehicle vary depending on the position of the lamellae 7 of the radiator louver 6 and depending on the position of the closing element 5, the invention proposes that the radiator louver 6, that is to say in particular its lamellae 7, and the at least one closing element 5 be coupled to one another such that, regardless of the position of the lamellae 7 of the radiator louver 6 and regardless of the position of the at least one closing element 5, an at least approximately uniform lift force, or an at least approximately uniform pitching moment, is imparted to the vehicle. Therefore, in contrast to radiator louvers known from the prior art, there is no adverse effect on the driving behavior of the motor vehicle to which the driver must adapt. Since the radiator louvers known from the prior art may vary the pitching moment without the driver of the motor vehicle noticing, the driving behavior of the motor vehicle also changes, without said change being indicated to the driver in any way. In particularly critical driving situations, therefore, an unexpected driving behavior of the motor vehicle may occur which can only be handled by the driver with difficulty.

The outlet 11 which is illustrated in FIGS. 1 and 2 and which is positioned substantially below the radiator 8 may of course also be extended further rearward counter to the direction of travel 10 and be arranged below an engine of the motor vehicle. For the corresponding control of the individual lamellae 7 of the radiator louver 6 or of the closing element 5, said closing element 5 may for example be operatively connected to the lowermost lamella 7 of the radiator louver 6 by way of an actuating element, for example in the form of a connecting rod 12. The actuating element in the form of the connecting rod 12 is schematically illustrated in FIG. 2.

To make the production process more economical, it may also be provided that the closing element 5 and at least one of the lamellae 7 are designed as identical parts. In the illustrations in FIGS. 1 and 2, both the closing element 5 and also all of the lamellae 7 which belong to the radiator louver 6 are of identical design at least with regard to their cross-sectional shape, such that it is conceivable to use one lamella 7 both in the radiator louver 6 and also as a closing element 5.

It can likewise be seen from FIGS. 1 and 2 that the closing element 5 and all of the lamellae 7 of the radiator louver 6 are mounted so as to be rotatable about substantially parallel axles which, in the illustrations in FIGS. 1 and 2, run in the vehicle transverse direction. Here, if the lamellae 7 of the radiator louver 6 and the closing element 5 are designed as identical parts, the inlet 9 of the bypass duct 4 is conventionally of slot-shaped design. Here, the lamellae 7 of the radiator louver 6 are conventionally adjusted as a function of a temperature of the radiator 8, in particular of a cooling liquid, wherein in particular, in the event of a start of the engine, the radiator louver 6 remains closed until a predefined radiator temperature is reached, and therefore the radiator 8 is protected from a gas flow which would cool said radiator. Once the radiator 8 has reached its operating temperature, the radiator louver 6 is opened and the bypass duct 4 is simultaneously closed until the temperature of the radiator 8 falls below a predefined limit value again. The control or closed-loop control of the radiator louver 6 and, connected thereto, of the closing element 5 may take place automatically.

A variety of louver drive options are available. It is possible for an electric motor, a thermal element, a vacuum unit, a bimetal or a magnet to be provided as a drive for the radiator louver 6 and/or for the closing element 5. Any of a long list of devices will be selected by those of skill in the art for driving the radiator louver 6 in the specific context. A louver drive 13 is schematically indicated in FIG. 2 with an input (e.g., radiator temperature-dependent drive signal) and an output.

It can be seen from FIG. 2 that, when the radiator louver 6 is open, the individual lamellae 7 thereof assume a non-parallel position with respect to one another. As a result, the gas flow entering into the radiator 8 is fanned out and a radiator surface is therefore acted on in a relatively uniform manner with the cooling gas flow. In this way, it is possible in particular for the efficiency of the radiator 8 to be fully utilized or increased in relation to parallel lamellae 7.

A particular advantage of the solution according to the invention is however that the previous decrease in the front axle lift force when the radiator louver 6 is closed is now compensated by the open closing element 5, since the gas flow which flows in this case through the bypass duct 4 increases the front axle lift force. By means of the coupling or design of the radiator louver 6 and of the closing element 5 according to the invention, therefore, a pitching moment which is preferably uniform at all times, that is to say also uniform front axle lift and rear axle lift forces, are generated regardless of the position of the lamellae 7 and of the closing element 5, such that in relation to radiator louvers known from the prior art, the radiator louver 6 according to the invention or the cooling device 2 according to the invention now no longer exerts any influence, in particular any negative influence, on the driving behavior of the motor vehicle.

The invention claimed is:

1. A cooling device adapted to be disposed in an engine bay of a motor vehicle, comprising:
    a radiator;
    a radiator louver with at least one lamella for controlling a passage of a gas flow through said radiator;
    at least one bypass duct disposed to bypass said radiator and a closing element disposed to selectively close off said at least one bypass duct; and
    said closing element being operatively connected to said radiator louver such that an opening of said radiator louver effects a closing of said bypass duct by closing said closing element, and a closing of said radiator louver effects an opening of said bypass duct by opening said closing element; and
    said radiator louver and said closing element being coupled to one another such that a substantially uniform lift force, or a substantially uniform pitching moment, is imparted to the motor vehicle, regardless of a position of said at least one lamella of said radiator louver and a position of said closing element.

2. The cooling device according to claim 1, wherein said closing element is one of a plurality of closing elements each coupled to said radiator louver.

3. The cooling device according to claim 1, wherein said radiator louver is disposed forward of said radiator in a direction of forward travel of the motor vehicle.

4. The cooling device according to claim 1, wherein said at least one bypass duct begins in front of said radiator louver, as seen in a direction of forward travel of the motor vehicle, and opens out into a vehicle surroundings below the cooling device or below an engine of the motor vehicle.

5. The cooling device according to claim 1, which comprises an actuating element operatively connecting said closing element with a lowermost lamella of said radiator louver.

6. The cooling device according to claim 5, wherein said actuating element is a connecting rod.

7. The cooling device according to claim 1, wherein said closing element and said at least one lamella are designed as identical parts.

8. The cooling device according to claim 1, wherein said closing element and said at least one lamella are rotatably mounted about substantially parallel axes.

9. The cooling device according to claim 1, wherein said at least one lamella of said radiator louver and said closing element are adjusted as a function of a radiator temperature.

10. The cooling device according to claim 1, which comprises a louver drive for driving said radiator louver and/or said closing element between a respective closed position and an open position.

11. The cooling device according to claim 10, wherein said louver drive is selected from the group consisting of an electric motor, a thermal element, a vacuum unit, a bimetal, and a magnet.

12. The cooling device according to claim 1, wherein said radiator louver comprises a plurality of individual lamellae disposed to be substantially aligned with one another in a closed state, and to be oriented obliquely with respect to one another in an at least partially open state to thereby cause a gas flow entering into said radiator to fan out.

13. A motor vehicle, comprising a cooling device according to claim 1.

* * * * *